Figures 1, 2:
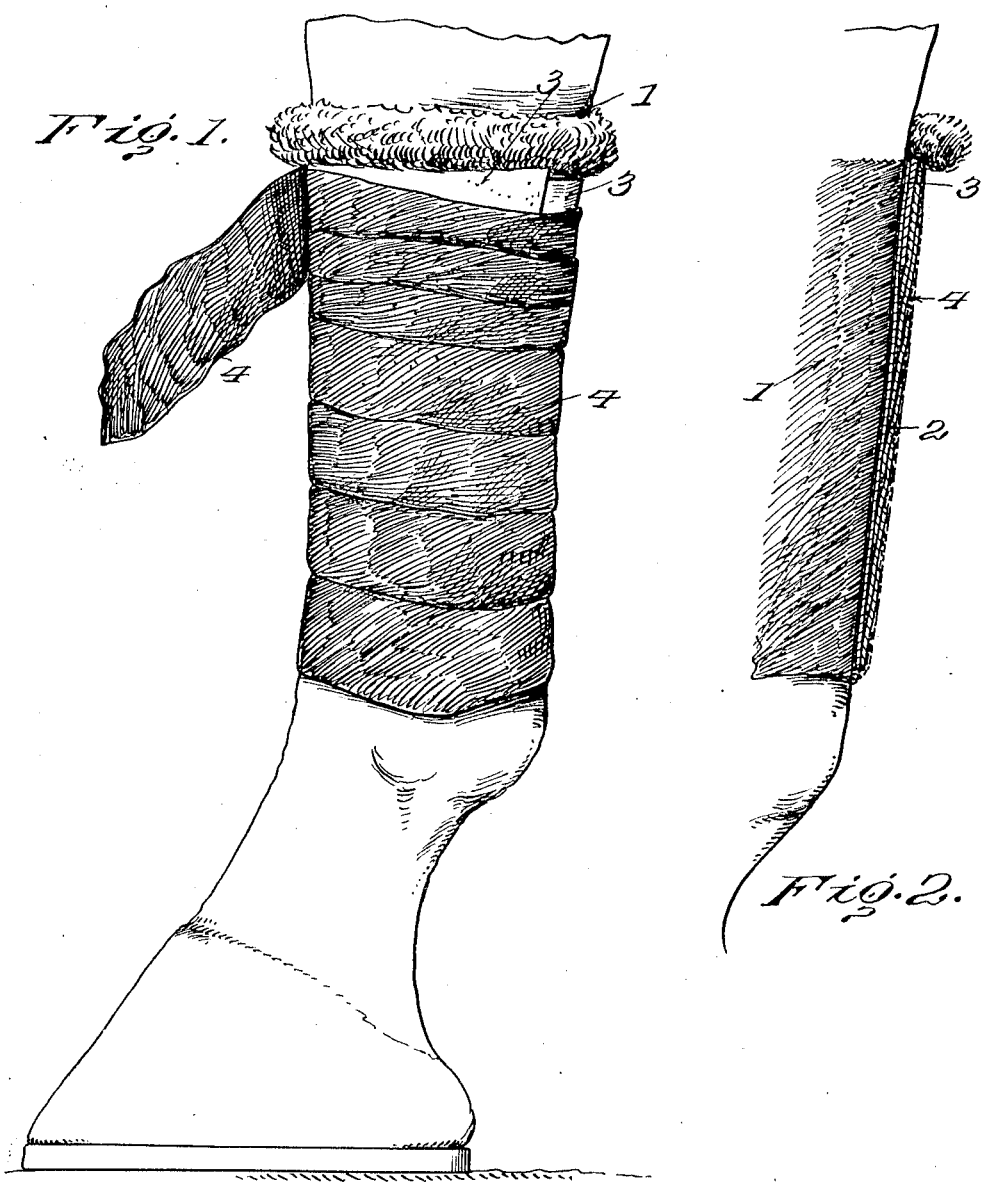

O. L. McMAHON.
BANDAGE.
APPLICATION FILED OCT. 11, 1910.

1,019,985.

Patented Mar. 12, 1912.

Witnesses
G. G. Loeffler.
Chas L. Richardson.

Inventor
O. L. McMahon.
By Greeley & McIntire
Attorney

UNITED STATES PATENT OFFICE.

OSCAR LEONARD McMAHON, OF COLUMBIA, TENNESSEE.

BANDAGE.

1,019,985.  Specification of Letters Patent.  Patented Mar. 12, 1912.

Application filed October 11, 1910. Serial No. 586,575.

*To all whom it may concern:*

Be it known that I, OSCAR L. MCMAHON, a citizen of the United States, residing at Columbia, in the county of Maury and State of Tennessee, have invented certain new and useful Improvements in Bandages; and I do hereby declare the following to be a full, clear, and exact description of the invention, such as will enable others skilled in the art to which it appertains to make and use the same.

This invention relates to bandages to be applied to the limbs of horses or the like, and has for an object the provision of a bandage which may be applied which will expand as the animal becomes heated by action, and which will cool when the animal stands still and harden sufficiently to support the tendons of the limbs.

Another object is the provision of means whereby all dirt, or other foreign matter, may be prevented from coming in contact with the limbs of the animal beneath the said bandage.

With the above and other objects in view this invention resides in the novel features of construction, formations, combinations and arrangements of parts to be hereinafter more fully described, claimed and illustrated in the accompanying drawings, in which—

Figure 1 is a side elevation of the limb of a horse with my improved bandage applied thereto, part of the same being unwound, and Fig. 2 is a sectional view taken through the same.

The bandage forming the subject matter of the present invention comprises a comparatively thick coating 1 of a composition, which preferably comprises

| | |
|---|---|
| Sheet gelatin | 4 oz. |
| Oxid of zinc | 4 " |
| Water | 10 " |
| Glycerin | sufficient quantity. |
| Coloring matter | any desired. | but which may consist of any ingredients which will soften as it becomes heated, and which will stiffen as it gradually becomes cooled off. This coating is applied to the limb of an animal, and retained in position by means of a layer of gauze, or like material, after which a bandage 2, saturated with the said composition, is applied thereto by winding the same around the limb of the animal, over the said composition and applying a portion of the said composition to the bandage as the same is wound upon the limb of the animal.

In order to prevent dirt or any foreign matter from coming in contact with the coating 1 of the composition, a strip of sheep skin, or like material, 3 is applied to the upper edge of the coating, with the wool side next to the said composition 1, so that the wool becomes embedded in the same, after which the upper end of the bandage 2 is wound over the said sheep skin to prevent its removal. An outer coating 4 of the composition is next applied to the bandage, which prevents the same from becoming unwound.

From the foregoing disclosure it will be manifest that as the animal becomes heated through motion the bandage will soften allowing the tendons to expand, giving free use to the tendons in the animal's limbs, and as the animal ceases motion and is cooled off, the bandage will stiffen slightly and support the said tendons, resting them and preventing any strain.

Having thus fully described this invention, what I claim and desire to secure by Letters Patent is:

A bandage, comprising a coating of compostion sensitive to heat and cold, said coating consisting of a sheet of gelatin, oxid of zinc, water, and glycerin, a strip of sheep skin engaging said coating, the wool of said sheep skin being embedded in said coating, a layer of gauze upon the coating and engaging the strip of sheep skin and a winding incasing the coating and the strip said winding being saturated with the composition for the purposes of preventing the displacement of said winding.

In testimony whereof I affix my signature in presence of two witnesses.

OSCAR LEONARD McMAHON.

Witnesses:
J. K. FARRELL,
W. H. LIPSCOMB.

Copies of this patent may be obtained for five cents each, by addressing the "Commissioner of Patents, Washington, D. C."